United States Patent [19]

Müller et al.

[11] 4,309,632
[45] Jan. 5, 1982

[54] ELECTRIC MACHINE WITH A ROTOR WITH A SUPERCONDUCTING FIELD WINDING

[75] Inventors: Otto Müller, Effeltrich; Dieter Kullmann, Langenzenn; Erich Weghaüpt, Mülheim, all of Fed. Rep. of Germany

[73] Assignee: Siemens Aktiengesellschaft, Berlin and Munich, Fed. Rep. of Germany

[21] Appl. No.: 72,639

[22] Filed: Sep. 6, 1979

[30] Foreign Application Priority Data

Sep. 21, 1978 [DE] Fed. Rep. of Germany ....... 2841163

[51] Int. Cl.³ .............................................. H02K 9/00
[52] U.S. Cl. ..................................... 310/52; 310/90; 62/505; 277/15
[58] Field of Search ......................... 310/10, 52, 64, 90, 310/261; 62/55, 505; 308/49, 187; 277/15

[56] References Cited

U.S. PATENT DOCUMENTS

| 3,731,865 | 5/1973 | Wood | 310/52 |
| 3,809,933 | 5/1974 | Sugawara | 310/10 |
| 3,942,053 | 3/1976 | Abolins | 310/10 |
| 3,991,588 | 11/1976 | Laskaris | 62/505 |
| 4,018,059 | 4/1977 | Hatch | 277/15 |
| 4,035,678 | 7/1977 | Lambrecht | 310/52 |
| 4,101,793 | 7/1978 | Berthet | 310/52 |

FOREIGN PATENT DOCUMENTS 1312698 4/1973 United Kingdom ................. 310/90

*Primary Examiner*—R. Skudy
*Attorney, Agent, or Firm*—Kenyon & Kenyon

[57] ABSTRACT

In an electric machine with a superconducting exciter winding and a cylindrical shaft end piece in its rotor around which end piece a nonrotating connector head part is arranged, with at least one bearing and at least one sealing device provided between these components, the radial bearing clearance is made so small that the connector head part follows the radial deflections of the shaft end piece from its ideal position relative to the axis of rotation permitting the use of seals with good sealing properties, in particular ferrofluidic seals.

15 Claims, 2 Drawing Figures

4,309,632

ELECTRIC MACHINE WITH A ROTOR WITH A SUPERCONDUCTING FIELD WINDING

BACKGROUND OF THE INVENTION

This invention relates to electric machines with superconducting field windings in general and more particularly to an improved sealing arrangement in such machine. Electric machines with rotors rotatably mounted in a stationary machine housing and containing a superconducting field winding to be deep cooled, one side of the rotor body being designed as a cylindrical shaft end piece and having, arranged around the shaft end piece, a nonrotating part of a connector head, there being provided between the shaft end piece and the connector head part at least one bearing and at least one sealing device, in which a transfer of a coolant takes place at the connector head, are known.

To cool a superconducting winding to be deep cooled in the rotor of an electrical machine, e.g., a turbogenerator, provisions for the transfer of a coolant suited for the purpose, particularly liquid or gaseous helium, between rotating and non-rotating machine parts must be made. Such transfer devices, also called couplers, are generally located on a connector head on the rotor face opposite the machine's drive system. It is through the couplers that the coolant is supplied to the rotor and discharged from it again. Designing such a coupler is particularly difficult, primarily with respect to minimizing thermal losses of the coolant loop for the field winding and with respect to small leakage rates of the cold coolant. Therefore, the couplers must be equipped with rotating packings which seal the coolant, in particular the liquid helium, well against the outside, on the one hand, and separate the inlet from the outlet side within the rotating system, on the other hand.

A machine with such a connector head is known, for instance, from "Advances in Cryogenic Engineering" Vol. 18, 1973, pages 372 to 381. This machine contains a rotor whose rotor body, on the side opposite the drive system, changes into a hollow cylindrical shaft end piece which projects into a connector head. The shaft end piece contains a central helium supply tube which is concentrically surrounded by two other tubes, between which an annular canal for the return flow of the helium from the rotor is formed. At its face, the shaft end piece is connected via a bearing to the connector head housing. The connector head is rigidly fastened to the machine housing enclosing the rotor.

The rotor of this machine performs both axial and radial oscillations, the amplitudes of which may amount to several hundred μm when going through critical speeds such as during the starting phase of the machine or in the event of trouble. Therefore, the motor bearings in which the rotor is mounted within the stationary machine housing and the shaft end piece in the connector head housing must have appropriate clearance. This clearance must also be taken into consideration in the design of the packings required between rotating and nonrotating parts in the connector head. Consequently, correspondingly large coolant leakage rates on these packings cannot be avoided without complicating the design.

Further sealing problems arise if, in addition, a pump for the evacuation of the rotor interior is to be connected to the connector head. Such evacuation is necessary in order to be able to maintain a high insulating vacuum between hot and cold rotor parts over long operating periods. Due to this requirement, at least one sealing device capable of sealing off a large pressure difference must be provided on the connector head between a fixed and a rotating part of the evacuation line. However, because of the oscillations of the rotor and, hence, of its shaft end piece at the connector head, such seals are difficult to manufacture.

SUMMARY OF THE INVENTION

Therefore, it is an object of the present invention to design the connector head of such a machine so that it can be equipped with sealing devices, in which the difficulties mentioned are eliminated, at least to a large extent.

According to the present invention, this problem is solved for an electric machine of the type described at the outset by providing a bearing with so little radial clearance that the connector head part follows the radial deflections of the shaft end piece from its ideal position with respect to an axis of rotation.

The invention is based on the thinking that radially constant and therefore very small gap widths of the sealing devices between parts of the connector head and of the shaft end piece can be ensured by making at least the nonrotating connector head parts surrounding the shaft end piece directly capable of following the oscillations of the rotor in the radial direction. This can be achieved without problems through appropriate bearings with small radial tolerances. The connector head part is then no longer connected rigidly to the stationary machine housing, but is supported independently thereof on the shaft end piece via these bearings.

The advantages of this design of the electric machine, therefore, are in particular that packings with practically constant, relatively small sealing gap widths can be used. The sealing properties of these packings can thus be improved in relatively simple manner.

According to a further development of the machine according to the present invention, the shaft end piece is equipped with a centrally disposed evacuating tube. A suitable coupler between the evacuating tube and a nonrotating evacuating line, to which an external pump can be connected, must therefore be provided at the connector head part. The sealing device of such a coupler must meet particularly stringent requirements regarding its sealing properties. These requirements can be met because very small sealing gap widths can be provided in the machine according to the present invention. Beyond this, due to the central location of the evacuating tube, only one single sealing device is advantageously required for the coupler.

The sealing device may, in particular, be a ferrofluidic seal. Such seals can also equalize relative displacements in the axial direction between rotating and nonrotating parts, such as occur due to the cooling of the rotor by the coolant, without impairment of their sealing properties.

DETAILED DESCRIPTION OF THE INVENTION

Figure 1:
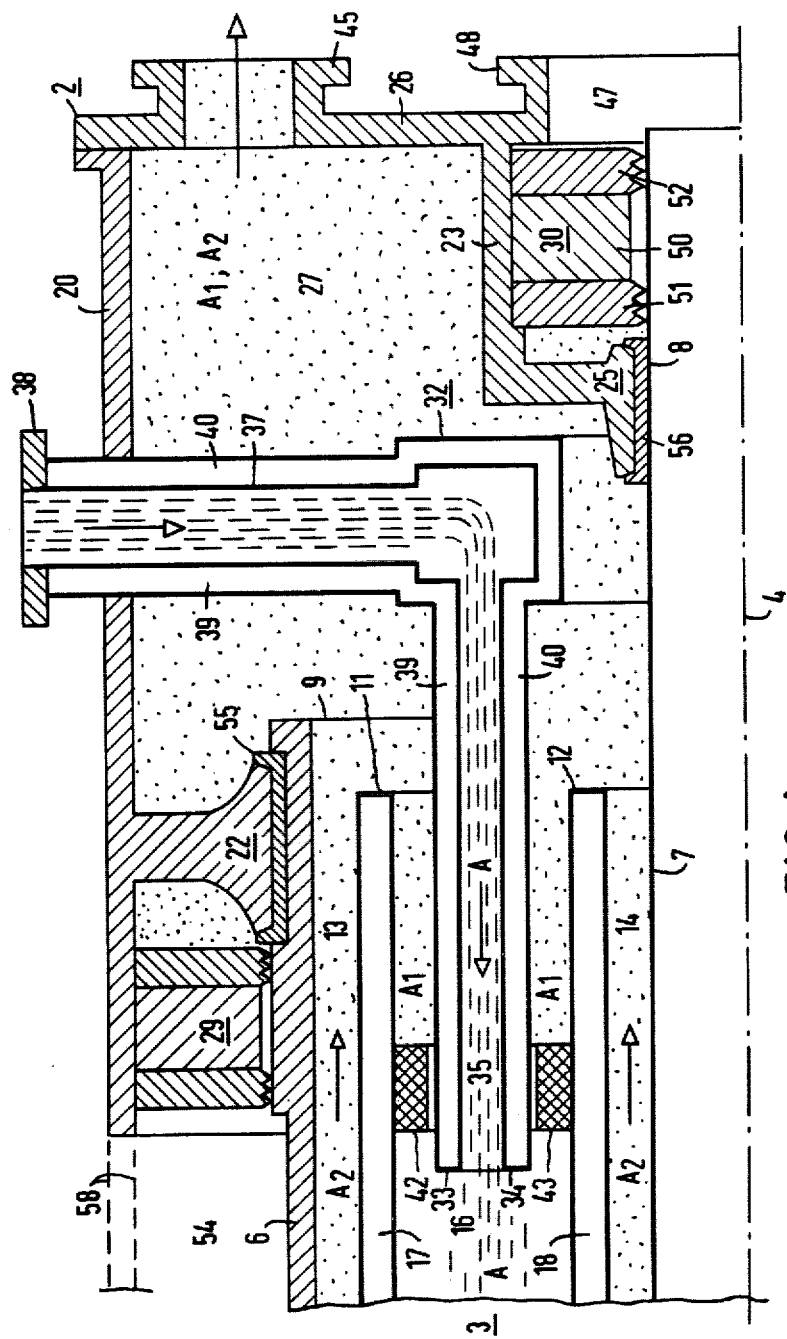
FIG. 1 schematically illustrates the upper half of a connector head part and a shaft end piece of a machine according to the present invention.

A lateral end piece 3 of the shaft of a rotor mounted rotatably about an axis of rotation 4 projects into a connector head part 2 of a machine, shown in a longitudinal section in the FIG. 1. This machine, not detailed in the FIG. 1, may, in particular, be a turbogenerator with a rotor which contains a superconducting field winding to be deep cooled and is surrounded by at least one co-rotating damping shield to be cooled. To reduce the introduction of heat into the deep cooled winding, the latter is also surrounded by evacuated spaces. For this purpose, the entire rotor is enclosed by a co-rotating vacuum housing (see U.S. Pat. No. 3,942,053 and "Siemens Forschungs - und Entwicklungsberichte", Volume 5 (1976) No. 1, pages 10 to 16). However, the rotor may also rotate in a vacuum chamber.

The shaft end piece 3 is rigidly connected to the rotor, not shown in the FIG. 1, and is generally located on the side of the machine opposite the drive side. The shaft end piece contains an outer hollow cylinder 6 at room temperature, which surrounds concentrically an inner hollow cylinder 7 whose end piece 8 projects out from the open face 9 of the outer hollow cylinder for a predetermined distance. Two double tubes 11 and 12 are so arranged concentrically between the outer hollow cylinder 6 and the inner hollow cylinder 7 that an outer annular canal 13 is formed between the outer double tube 11 and the outer hollow cylinder 6, and an inner annular canal 14 is formed between the inner double tube 12 and the inner hollow cylinder 7. An annular chamber 16 is defined by the two double tubes 11 and 12. Each one of the two double tubes consists of two concentric hollow cylinders, mutually closed off in a vacuum tight manner at their face. The inner chambers 17 and 18, respectively formed in this manner between the two hollow cylinders of each double tube are evacuated.

The nonrotating connector head part 2 contains a hollow cylindrical, external housing 20 which encloses the end of the rotating outer hollow cylinder 6 of the shaft end piece 3 over a distance in the axial direction and is supported in a main bearing on this hollow cylinder 6. Furthermore, the connector head part 2 contains an inner hollow cylindrical housing part 23 which surrounds the end portion 8 of the inner, rotating, hollow cylinder 7 of the shaft end piece 3 concentrically and is supported by a secondary bearing 25 on the end portion 8. This housing part 23 is rigidly connected to the external housing 20 by a face part 26. These parts 20, 23 and 26 of the conductor head part 2 define a cavity 27 inside the connector head part 2, essentially located in front of the face 9 of the outer hollow cylinder 6 of the shaft end piece 3. A sealing device 29 is provided parallel to the bearing 22 between the nonrotating external housing 20 and the rotating outer hollow cylinder 6 to seal this cavity 27. The internal housing part 23 is also sealed in a corresponding manner against the end portion 8 of the inner hollow cylinder 7 by means of a sealing device 30.

According to the present invention, the connection between the connector head part 2 and the shaft end piece 3 enclosed by it is such that the connector head part 2 follows, without significant clearance, the deflections of the rotor, and therefore of its shaft end piece 3, in the radial direction from its ideal center position with respect to the axis of rotation 4. This can be ensured by an appropriate design of the main bearing 22 between the outer hollow cylinder 6 and the external housing 20 and of the secondary bearing 25 between the end portion 8 of the inner hollow cylinder 7 and the internal housing part 23. Bearings with very close tolerances in the radial direction are suitable. Such bearings may be sliding bearings, for example.

Provided at the connector head part 2 are the feeding and discharging devices for the coolant required to cool the superconducting field winding and for coupling coolant into and out of the shaft end piece 3, the coolant generally being helium. A feeding device 32 feeds liquid helium A into the annular chamber 16. This device contains two pieces of double tube 33 and 34 which project into the annular chamber 16, are disposed concentric to the axis of rotation 4, and between which an annular supply canal 35 is formed. This supply canal, extending parallel to the axis, is connected, at its end located in the cavity 27 of the connector head part 2, to one or more supply lines 37 extending radially. This supply line projects out from the external housing 20 of the connector head part 2, which is provided with an appropriate leadthrough, and is equipped with a connecting flange 38 to which a refrigeration equipment furnishing the liquid helium A can be connected by means of a flexible connecting hose, not shown in the FIG. 1. To reduce the introduction of heat into the liquid helium A, all helium carrying parts of the inlet device 32 are of double wall design, spaces 39 and 40 of which can be evacuated, being formed between adjacent walls.

To prevent the liquid helium fed into the annular chamber 16 from flowing back directly into the cavity 27 of the connector head part 2, at least one ring shaped sealing device 42 or 43 is provided between the tubes 11 and 33 as well as between the tubes 12 and 34. These sealing devices may be labyrinth seals or lip-type seals, for instance. In this way, only a small percentage of the helium A, designated $A_1$, reaches the cavity 27 of the connector head part 2 on account of leakage past these sealing devices.

Moreover, the helium heated in the machine rotor and marked $A_2$, is fed through the annular canals 13 and 14 into this cavity 27, where it is mixed with the helium $A_1$. This heated helium $A_1$, $A_2$ is discharged from the cavity 27 at a flange 45 on the face 26 of the connector head part 2. Flexibly connected to this flange is a return line, not shown in the FIG. 1, which is connected to the refrigeration equipment.

It is assumed in the machine according to the illustrated embodiment that the vacua required for the thermal insulation of the cold parts of the rotor, in particular of the superconducting exciter winding, are maintained by constantly pumping out the appropriate vacuum chambers. For this purpose, the inner hollow cylinder 7 of the shaft end piece 3 is advantageously designed as a co-rotating evacuating tube. The end portion 8 of this hollow cylinder, therefore, opens into a sub chamber 47 of the connector head part 2 near the axis, which is defined by the internal housing part 23, the face part 26 and the secondary bearing 25. For the evacuation of the sub chamber, the face part 26 is provided with a connecting flange 48 to which an external evacuating device can be flexibly connected. The sealing device 30 located between the hollow cylindrical housing part 23 and the end portion 8 of the evacuating tube 7 seals the sub chamber 47 in a vacuum tight manner against the cavity 27 of the connector head part 2. This sealing device must meet stringent requirements because the pressure difference between the two chambers 27 and 47 is very large and may be as high as, say $10^{-4}$ Pa. Since, according to the present invention, the distance between the internal hollow cylindrical housing part 23 and the end portion 8 remains virtually unchanged due to the special mounting of the connector head part 2, even when there are deflections of the shaft end piece 3, these requirements can be met by a ferrofluidic seal. The seal contains a ring magnet 50 which encloses the end portion 8 of the evacuating tube 7 with a predetermined spacing. It is fastened to the housing part 23 and is equipped at its two opposite faces with pole shoes 51 and 52 in the shape of annular discs. The pole shoes are tooth shaped on their side facing the end portion 8; it is possible to maintain an extremely narrow gap between them and the outside diameter of the end portion. This gap is filled with a ferromagnetic sealing fluid. Such seals are known, for instance, from the British Pat. No. 1,312,698. On account of the extremely narrow gap widths to be maintained in mounting the connector head part according to the present invention, the retaining forces acting upon the sealing fluid can be made sufficiently strong to preclude the sealing fluid from being sucked into the subchamber 47. The sealing properties of such a seal are not impaired even when the shaft end piece 3 contracts in the axial direction upon being cooled by the cryogenic medium.

According to the illustrated embodiment, there is further provided, as the sealing device 29 between the external housing 20 of the connector head part 2 and the outer hollow cylinder 6 of the shaft end piece 3, another ferrofluidic seal to prevent the heated helium $A_1$, $A_2$ present in the cavity 27 of the connector head part 2 from escaping into an outer chamber 54 surrounding the hollow cylinder 6. Such a seal can be of advantage in particular when a great underpressure prevails in this outer chamber also, to thereby prevent excessive heat infiltration into the helium $A_2$ carried in the outer annular canal 13.

According to the illustrated embodiment, it is assumed, however, that the outer hollow cylinder 6 should be at normal pressure, being the outer vacuum housing of the shaft end piece 3 at the same time. Then the extreme pressure differences existing in the case of the ferrofluidic seal 30 do not prevail on both sides of the sealing device 29. The requirements regarding the sealing characteristics of the sealing device 29, therefore, are not as stringent, for which reason another sealing device such as a labyrinth seal or a lip-type seal may also be provided. Optionally, such a seal may be omitted altogether, provided the main bearing 22 itself has adequate sealing properties.

According to the illustrated embodiment shown in the FIG. 1, a shift of the entire connector head part 2 on the shaft end piece 3 in the axial direction is precluded essentially by a special design of the main bearing 22. For this purpose, the end of this bearing facing the outer hollow cylinder 6 is provided with a hollow cylindrical bearing shell 55 running in a corresponding slot in the outside surface of the hollow cylinder 6.

If, in an analogous manner, a bearing shell 56 of the secondary bearing 25 engages a slot in the outside surface of the end portion 8 of the evacuating tube 7 also, the evacuation tube must further be equipped with an expansion device to be able to compensate for the axial shrinkage of this tube upon being cooled. In the illustrated embodiment of the FIG. 1 it is assumed, however, that the tube 7 can move axially relative to the bearing shell 56 of the secondary bearing 25.

Figure 2:
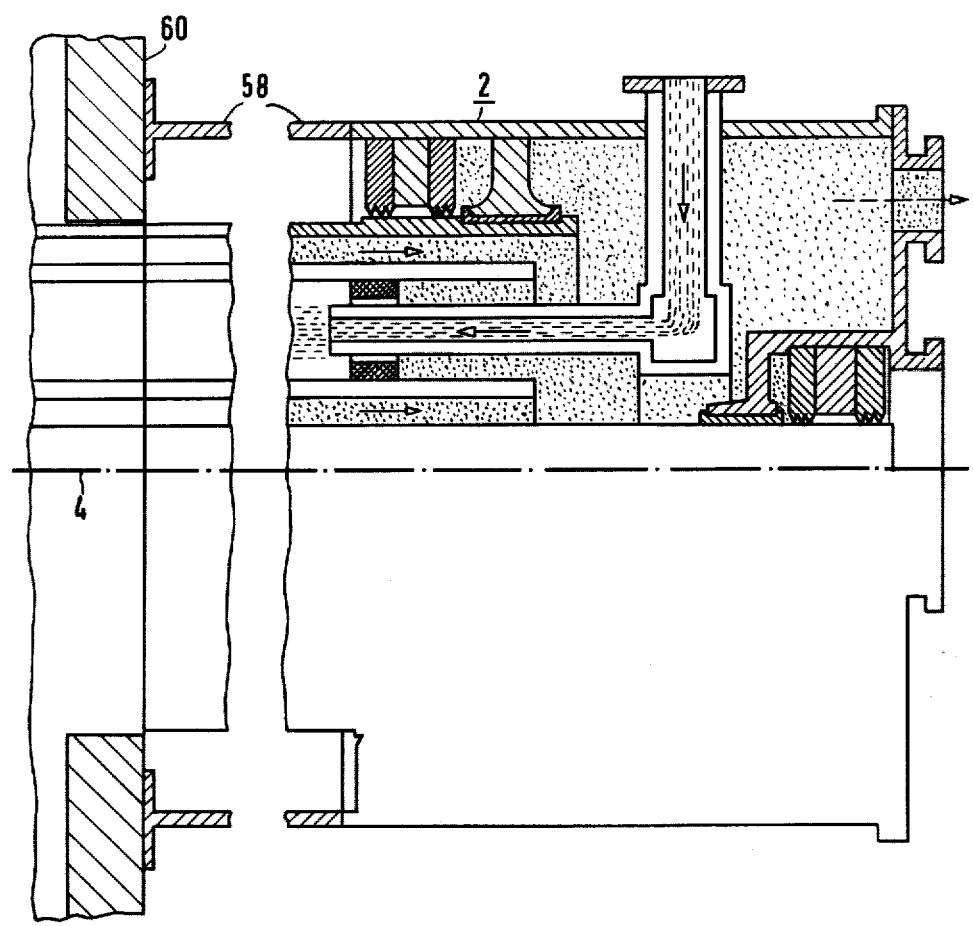
FIG. 2 illustrates the flexible connection of the connector part of FIG. 1 to the machine.

In addition, the connector head part 2 must be secured against rotation in the circumferential direction about the shaft end piece 3. For this purpose, intermediate elastic members 58 shown in FIG. 2 may be provided, for instance, between the fixed, external machine housing 60 enclosing the rotor and the external housing 20 of the connector head part 2. In FIG. 1 the end of such an intermediate member is indicated by dashed lines 58. These intermediate members, by means of which an axial fixation of the connector head part 2 is also possible, may also be designed as a vacuum tight jacket around the outer hollow cylinder 6 of the shaft end piece 3, if an insulating vacuum prevails in the chamber 54.

The components designated 2 in the drawings represent, in general, one portion of a connector head only. It is essential for these components, however, that they follow the radial deflections of the shaft end piece 3. They may also be connected to other stationary components of a connector head which are rigidly joined to the machine housing.

What is claimed is:

1. In an electric machine with a rotor rotatably mounted in a stationary machine housing for rotation about an axis of rotation, and containing a superconducting field winding to be cooled, one side of the rotor body being designed as a cylindrical shaft end piece, said cylindrical shaft end piece deflecting from its ideal central position with respect to the axis of rotation, a nonrotating part of a connector head surrounding said cylindrical shaft and piece, at least one bearing and at least one sealing device disposed between one shaft end piece and the nonrotating part of the connector head, and means for permitting coolant transfer at the connector head, the improvement comprising:
    a. the bearing having such close radial tolerances that the nonrotating part of the connector heat part will follow at least the main part of the radial deflections of the shaft end piece from its ideal position; and
    b. the nonrotating part of the connector head connected directly or indirectly with the stationary machine housing in such a manner that it is capable of said radial deflections.

2. The improvement according to claim 1, wherein said bearing is a sliding bearing.

3. The improvement according to claim 1, wherein the connector head part is fixed to the shaft end piece in the axial direction by said bearing.

4. The improvement according to claim 1, wherein said shaft end piece contains an outer and an inner hollow cylindrical component and said connector head part also contains inner and outer hollow cylindrical components with the respective hollow cylindrical components of the connector head part and shaft disposed concentrically to each other.

5. The improvement according to claim 4, wherein the inner hollow cylindrical component of the shaft end piece comprises a centrally disposed evacuating tube.

6. The improvement according to claim 4, wherein at least one bearing is disposed between each of the respective adjacent hollow cylindrical components of the shaft end piece and of the connector head part.

7. The improvement according to claim 4, wherein at least one sealing device is disposed between each of the respective adjacent hollow cylindrical components of the shaft end piece and of the connector head part.

8. The improvement according to claim 1, wherein said sealing devices include at least one ferrofluidic seal.

9. The improvement according to claim 1, wherein the shaft end piece is provided with at least two cavities of annular cross section for the supply of coolant to the field winding and for the return flow of the coolant.

10. The improvement according to claim 9, wherein the annular cavity for the supply of coolant is disposed between two tubular components and further including the end of a coolant feeder line of annular cross section, projecting therein.

11. The improvement according to claim 10, and further including packings sealing the feeder line against the tubular components of the shaft end piece.

12. The improvement according to claim 9 wherein the annular cavity of the shaft end piece for the return flow of the coolant is connected in coolant tight manner to a cavity within the connector head part.

13. The improvement according to claim 1 and further including elastic intermediate members disposed between the connector head and the machine housing.

14. The improvement according to claim 13, wherein said elastic intermediate members form part of a vacuum housing around the shaft end piece.

15. In an electric machine with a rotor rotatably mounted in a stationary machine housing for rotation about an axis of rotation, and containing a superconducting field winding to be cooled, one side of the rotor body being designed as a cylindrical shaft end piece, a nonrotating part of a connector head surrounding said cylindrical shaft end piece, at least one bearing and at least one sealing device disposed between the shaft end piece and the connector head, and means for permitting coolant transfer at the connector head, the improvement comprising:
a. the nonrotating part of the connector head mounted in such a manner that it is capable of radial deflections with respect to the stationary machine housing; and
b. the bearing having such close radial tolerances that the connector head part will follow the radial deflections of the shaft end piece from its ideal position with respect to said axis of rotation.

* * * * *